United States Patent
Kondo et al.

(10) Patent No.: US 12,099,139 B2
(45) Date of Patent: Sep. 24, 2024

(54) AXIAL MISALIGNMENT ESTIMATION APPARATUS

(71) Applicant: DENSO CORPORATION, Kariya (JP)

(72) Inventors: Katsuhiko Kondo, Nisshin (JP); Takuya Takayama, Kariya (JP)

(73) Assignee: DENSO CORPORATION, Kariya (JP)

( * ) Notice: Subject to any disclaimer, the term of this patent is extended or adjusted under 35 U.S.C. 154(b) by 389 days.

(21) Appl. No.: 17/454,637

(22) Filed: Nov. 12, 2021

(65) Prior Publication Data

US 2022/0065987 A1 Mar. 3, 2022

Related U.S. Application Data

(63) Continuation of application No. PCT/JP2020/018824, filed on May 11, 2020.

(30) Foreign Application Priority Data

May 15, 2019 (JP) .................................. 2019-092107

(51) Int. Cl.
*G01S 7/40* (2006.01)
*G01S 13/931* (2020.01)

(52) U.S. Cl.
CPC .............. *G01S 7/40* (2013.01); *G01S 13/931* (2013.01)

(58) Field of Classification Search
CPC .................................. G01S 7/40; G01S 13/931
See application file for complete search history.

(56) References Cited

U.S. PATENT DOCUMENTS

| | | | |
|---|---|---|---|
| 2007/0115169 A1* | 5/2007 | Kai | G01S 13/931 342/174 |
| 2008/0012752 A1 | 1/2008 | Okamura et al. | |
| 2011/0068970 A1 | 3/2011 | Mitsumoto | |
| 2019/0219673 A1 | 7/2019 | Morinaga et al. | |

FOREIGN PATENT DOCUMENTS

| | | | |
|---|---|---|---|
| JP | 2002-228749 A | 8/2002 | |
| WO | WO-2007015288 A1 * | 2/2007 | G01S 13/931 |

* cited by examiner

*Primary Examiner* — Peter M Bythrow
*Assistant Examiner* — Nazra Nur Waheed
(74) *Attorney, Agent, or Firm* — MASCHOFF BRENNAN

(57) ABSTRACT

An axial misalignment estimation apparatus estimates an axial misalignment angle of a radar apparatus mounted in a moving body. The estimation apparatus repeatedly acquires, for each reflection point detected by the radar apparatus, reflection point information including at least a relative speed and an orientation angle. The estimation apparatus acquires a speed of the moving body and extracts a stationary reflection point estimated to be a stationary object from the reflection points based on the speed of the moving body. The estimation apparatus selects, for each divided region, the stationary reflection point included in the divided region such that a predetermined condition is met. The divided region is a detection region of the radar apparatus that is divided into a plurality of parts in at least either of a horizontal direction and a vertical direction. The estimation apparatus determines the axial misalignment angle using the stationary reflection point selected.

15 Claims, 13 Drawing Sheets

AXIAL MISALIGNMENT ESTIMATION APPARATUS

CROSS-REFERENCE TO RELATED APPLICATION

The present application is a continuation application of International Application No. PCT/JP2020/018824, filed on May 11, 2020, which claims priority to Japanese Patent Application No. 2019-092107, filed on May 15, 2019. The contents of these applications are incorporated herein by reference in their entirety.

BACKGROUND

Technical Field

The present disclosure relates to a technology for estimating an axial misalignment angle of a radar apparatus that detects an orientation or a relative speed of an object.

Related Art

In an onboard radar apparatus, if so-called axial misalignment in which a center axis of a radar beam becomes misaligned occurs as a result of a setup state changing for some reason, detection error may increase, and a position and the like of an object may be erroneously detected. As a technology for detecting such axial misalignment, the following technology is known. In this technology, in the onboard radar apparatus, an axial misalignment angle is estimated by taking advantage of an observed relative speed of a stationary object being dependent on an orientation angle.

SUMMARY

One aspect of the present disclosure provides an axial misalignment estimation apparatus that estimates an axial misalignment angle of a radar apparatus that is mounted in a moving body. The axial misalignment estimation apparatus repeatedly acquires reflection point information, for each reflection point that is detected by the radar apparatus. The reflection point information includes at least a relative speed between the radar apparatus and the reflection point, and an orientation angle that is an orientation angle of the reflection point and is at least either of a horizontal angle and a vertical angle that are determined with reference to a beam direction that is a direction along a center axis of a radar beam. The axial misalignment estimation apparatus acquires a speed of the moving body and extracts a stationary reflection point that is estimated to be a stationary object from the reflection points based on the speed of the moving body. The axial misalignment estimation apparatus selects, for each divided region, the stationary reflection point that is included in the divided region such that a predetermined condition is met. The divided region is a detection region of the radar apparatus that is divided into a plurality of parts in at least either of a horizontal direction and a vertical direction. The axial misalignment estimation apparatus determines the axial misalignment angle using the stationary reflection point selected.

DESCRIPTION OF THE EMBODIMENTS

Figure 1:
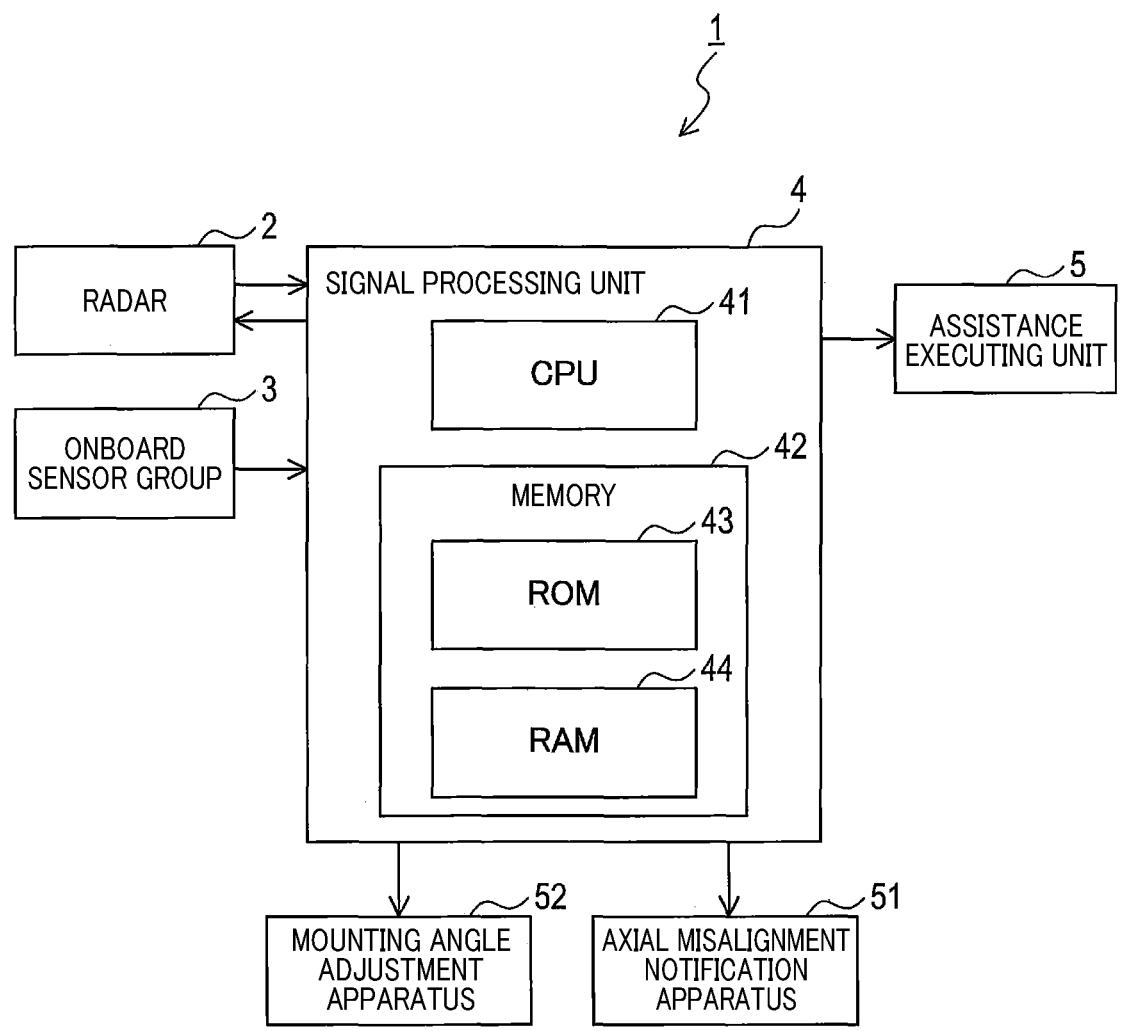
FIG. 1 is a block diagram of a configuration of a vehicle control system.

In an onboard radar apparatus, if so-called axial misalignment in which a center axis of a radar beam becomes misaligned occurs as a result of a setup state changing for some reason, detection error may increase, and a position and the like of an object may be erroneously detected. As a technology for detecting such axial misalignment, Japanese Patent Publication No. 3733863 discloses a technology in which, in the onboard radar apparatus, an axial misalignment angle is estimated by taking advantage of an observed relative speed of a stationary object being dependent on an orientation angle.

However, in the radar apparatus, there may be an orientation at which detection accuracy regarding the orientation angle is high and an orientation at which the detection accuracy is low. As a result of detailed examination by the inventors, an issue has been found in that, in a conventional apparatus described in Japanese Patent Publication No. 3733863, in cases in which an object present so as to be biased towards an orientation at which detection accuracy of the radar apparatus is low, estimation accuracy regarding the axial misalignment angle decreases.

It is thus desired to provide a technology for suppressing decrease in estimation accuracy regarding an axial misalignment angle.

An exemplary embodiment of the present disclosure provides an axial misalignment estimation apparatus that estimates an axial misalignment angle of a radar apparatus that is mounted in a moving body. The axial misalignment estimation apparatus includes an acquiring unit, an extracting unit, a selecting unit, and an axial misalignment calculating unit.

The acquiring unit is configured to repeatedly acquire reflection point information, for each reflection point that is detected by the radar apparatus. The reflection point information includes at least a relative speed between the radar apparatus and the reflection point, and an orientation angle that is an orientation angle of the reflection point and is at least either of a horizontal angle and a vertical angle that are determined with reference to a beam direction that is a direction along a center axis of a radar beam.

The extracting unit is configured to acquire a speed of the moving body and extract a stationary reflection point that is estimated to be a stationary object from the reflection points based on the speed of the moving body.

The selecting unit is configured to select, for each divided region, the stationary reflection point that is included in the divided region such that a predetermined condition is met, the divided region being a detection region of the radar apparatus that is divided into a plurality of parts in at least either of a horizontal direction and a vertical direction.

The axial misalignment calculating unit is configured to determine the axial misalignment angle using the stationary reflection point selected by the selecting unit.

As a result, the stationary reflection points that meet a condition are selected. Thus, the number of stationary reflection points that are selected can be reduced by the condition being appropriately prescribed. In addition, the axial misalignment angle is determined using the selected stationary reflection points. Thus, when the number of selected stationary reflection points is reduced, effects of detection error are suppressed. Therefore, decrease in estimation accuracy regarding the axial misalignment angle can be suppressed.

An embodiment of the present disclosure will hereinafter be described with reference to the drawings. Here, "vertical" referred to below is not limited to "vertical" in the strict sense and may not be strictly "vertical" as long as a similar effect is obtained. This similarly applies to "horizontal" and "coincide" referred to below.

1. Configuration

A vehicle control system 1 shown in FIG. 1 is a system that is mounted in a vehicle. The vehicle control system 1 includes a radar apparatus 2, an onboard sensor group 3, a signal processing unit 4, and an assistance executing unit 5. Hereafter, the vehicle in which the vehicle control system 1 is mounted is also referred to as an own vehicle. In addition, a vehicle-width direction of the vehicle is also referred to as a horizontal direction. A vehicle-height direction of the vehicle is also referred to as a vertical direction.

Figure 2:
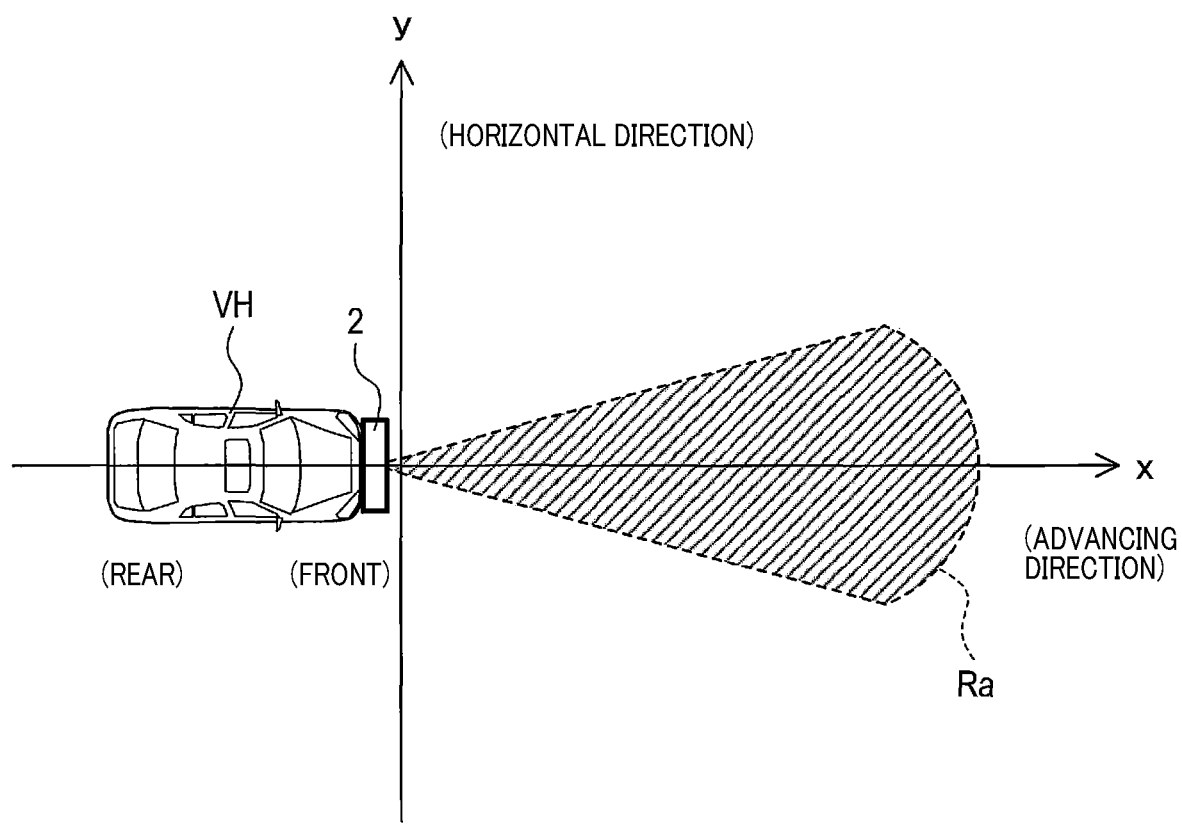
FIG. 2 is an explanatory diagram for explaining an irradiation region of a radar wave in a horizontal direction.
Figure 3:
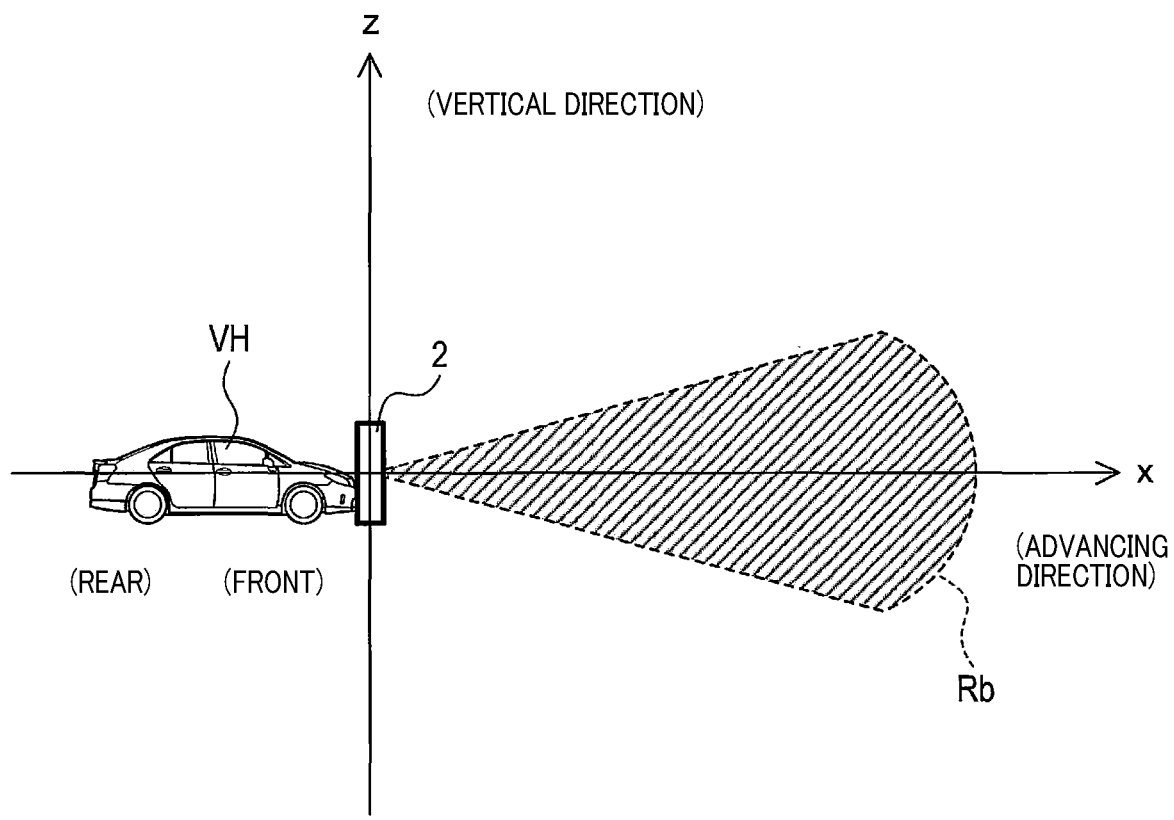
FIG. 3 is an explanatory diagram for explaining an irradiation region of a radar wave in a vertical direction.

As shown in FIG. 2 and FIG. 3, the radar apparatus 2 is mounted on a front side of a vehicle VH. The radar apparatus 2 irradiates a radar wave within a predetermined angular region Ra in the horizontal direction ahead of the vehicle VH and within a predetermined angular region Rb in the vertical direction ahead of the vehicle VH. The radar apparatus 2 generates reflection point information that is related to a reflection point that reflects the radar wave by receiving a reflected wave of the irradiated radar wave.

Here, the radar apparatus 2 may be a so-called millimeter-wave radar that uses a millimeter-waveband electromagnetic wave as the radar wave. Alternatively, the radar apparatus 2 may be a laser radar that uses laser light as the radar wave or a sonar that uses sound waves as the radar wave. In any case, an antenna unit that transmits and receives the radar waves is configured to be capable of detecting an arrival direction of the reflected wave in both the horizontal direction and the vertical direction. According to the present embodiment, the antenna unit includes array antennas that are arrayed in the horizontal direction and the vertical direction.

The radar apparatus 2 is attached such that a beam direction that is a direction along a center axis CA direction of the irradiated radar beam coincides with a front/rear direction, that is, an advancing direction of the own vehicle. The radar apparatus 2 is used to detect various targets that are present ahead of the own vehicle. The reflection point information that is generated by the radar apparatus 2 includes at least a relative speed between the radar apparatus 2 and the reflection point, and an orientation angle of the reflection point.

Figure 4:
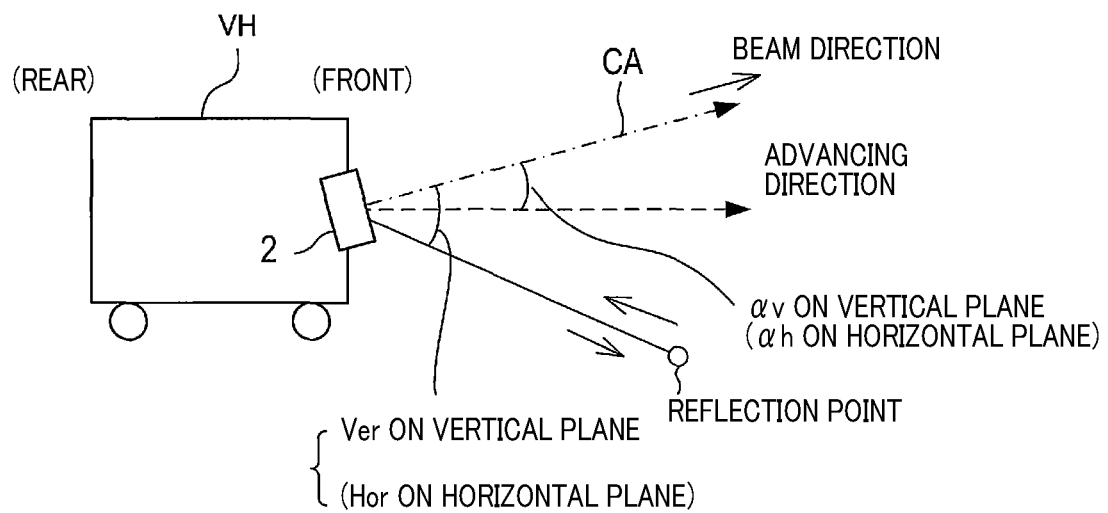
FIG. 4 is an explanatory diagram for explaining an orientation angle of a reflection point

As shown in FIG. 4, the orientation angle of the reflection point is at least either of an angle (referred to, hereafter, as a horizontal angle) Hor in the horizontal direction and an angle (referred to, hereafter, as a vertical angle) Ver in the vertical direction at which the reflection point is present, the angles being determined with reference to the beam direction that is the direction along the center axis of the radar beam. Here, according to the present embodiment, both the vertical angle Ver and the horizontal angle Hor are included in the reflection point information as information that indicates the orientation angle of the reflection point. However, FIG. 4 shows an aspect in which axial misalignment in the vertical direction, that is, axial misalignment on an x-z plane that is a vertical plane has occurred in the radar apparatus 2. Hereafter, an axial misalignment angle in the vertical direction is denoted by av. Axial misalignment refers to a state in which a misalignment has occurred between the beam direction of the radar apparatus 2 and the advancing direction of the own vehicle. The axial misalignment angle refers to an angle that indicates a magnitude of the misalignment.

According to the present embodiment, the radar apparatus 2 uses a FMCW system. The radar apparatus 2 alternately transmits a radar wave of an upward modulation section and a radar wave of a downward modulation section at a modulation cycle that is set in advance, and receives the reflected radar waves. FMCW is an abbreviation of Frequency-Modulated Continuous Wave. As a result, at each modulation cycle, the radar apparatus 2 detects the relative speed relative to the reflection point, and the horizontal angle Hor and the vertical angle Ver that are the orientation angle of the reflection point as the reflection point information. Here, the radar apparatus 2 can further detect a distance to the reflection point and reception power of the received radar wave as the reflection point information.

The onboard sensor group 3 is various sensors that are mounted in the vehicle VH to detect a state of the vehicle VH and the like. Here, as the sensors that configure the onboard sensor group 3, at least a vehicle speed sensor that detects a vehicle speed based on rotation of a wheel is included.

The signal processing unit 4 is mainly configured by a microcomputer that includes a central processing unit (CPU) 41, a read-only memory (ROM) 43, and a random access memory (RAM) 44, and a semiconductor memory (hereafter, a memory 42) such as a flash memory. Various functions of the signal processing unit 4 are actualized by the CPU 41 running a program that is stored in a non-transitory, tangible recording medium. In this example, the memory 42 corresponds to the non-transitory, tangible recording medium in which the program is stored. In addition, as a result of this program being run, a method corresponding to the program is performed. Here, the signal processing unit 4 may be configured by one or a plurality of microcomputers. Furthermore, a means for actualizing the various functions provided by the signal processing unit 4 is not limited to software. Some or all elements may be actualized using a single or a plurality of pieces of hardware. For example, when the above-described functions are actualized by an electronic circuit that is hardware, the electronic circuit may be actualized by a digital circuit that includes numerous logic circuits, an analog circuit, or a combination thereof.

Processes performed by the signal processing unit 4 include at least a target recognition process and an axial misalignment estimation process.

Of the processes, the target recognition process detects a traffic lane in which the own vehicle is traveling, a leading vehicle that is traveling in the same traffic lane as the own vehicle, another vehicle, an obstacle, and the like based on the reflection point information acquired from the radar apparatus 2, and various types of information acquired from the onboard sensor group 3. A processing result of the target recognition process is provided to the assistance executing unit 5 and the like.

Meanwhile, the axial misalignment estimation process detects the axial misalignment angle of the beam direction of the radar apparatus 2 in relation to the advancing direction of the vehicle VH. Details will be described hereafter. Here, the signal processing unit 4 that performs this axial misalignment estimation process corresponds to an axial misalignment estimation apparatus.

The assistance executing unit 5 controls various types of onboard equipment and performs predetermined driving assistance based on the processing result of the target recognition process performed by the signal processing unit 4. The onboard equipment to be controlled includes a monitor that displays various types of images and audio equipment that outputs warning sounds and guidance sounds. In addition, the onboard equipment may include control apparatuses that control an internal combustion engine, a power train mechanism, a brake mechanism, and the like of the own vehicle.

An axial misalignment notification apparatus 51 is an audio output apparatus that is set inside a vehicle cabin and outputs a warning sound to passengers of the vehicle VH. Here, the audio equipment or the like that is provided in the assistance executing unit 5 may be used as the axial misalignment notification apparatus 51.

A mounting angle adjustment apparatus 52 includes a motor and a gear that is attached to the radar apparatus 2. The mounting angle adjustment apparatus 52 rotates the motor based on a drive signal that is outputted from the signal processing unit 4. As a result, rotational force of the motor is transmitted to the gear, and the radar apparatus 2 can be rotated around an axis along the horizontal direction and an axial along the vertical direction.

2. Processes

[2-1. Axial Misalignment Estimation Process]

Figure 5:
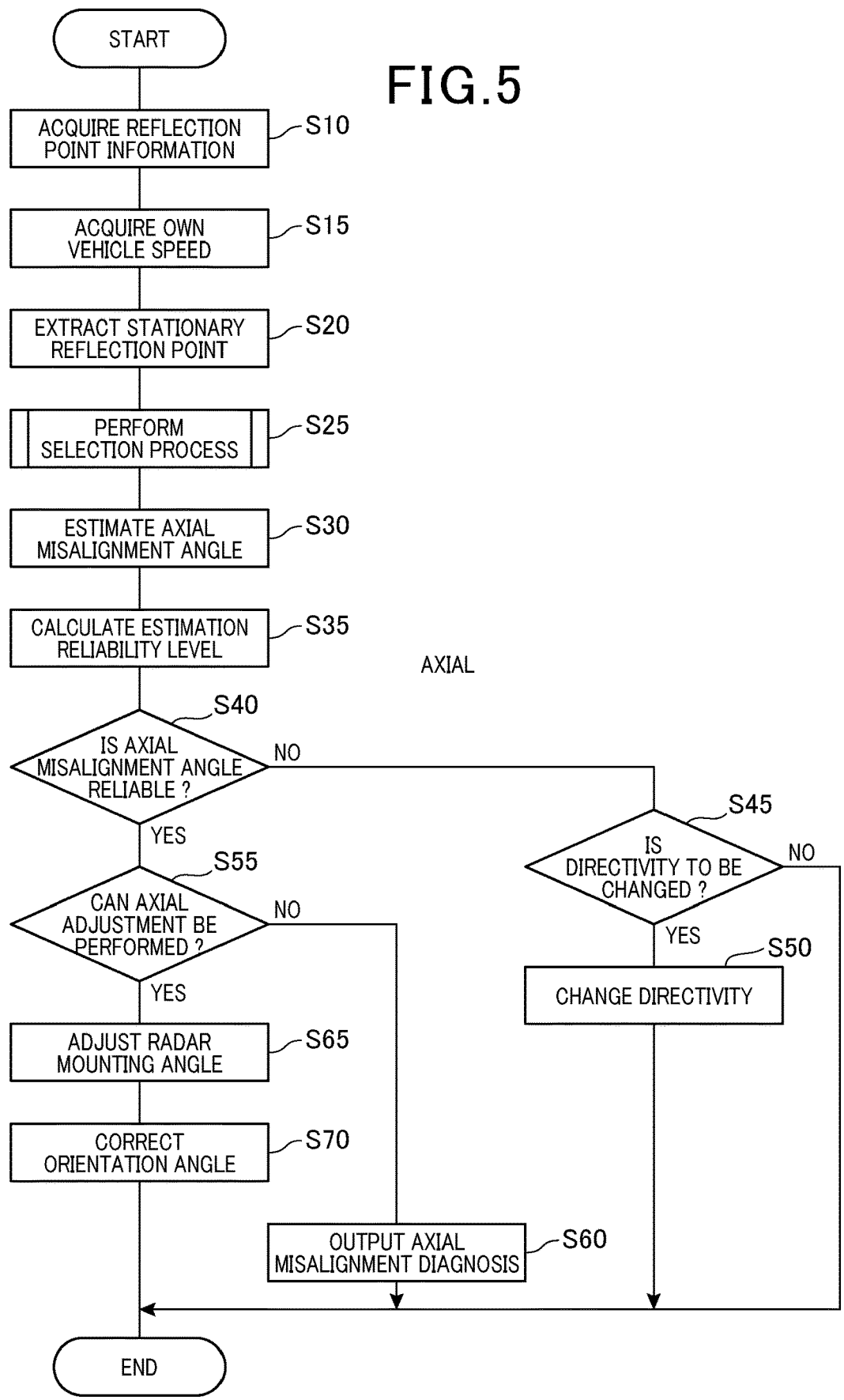
FIG. 5 is a flowchart of an axial misalignment estimation process

Next, the axial misalignment estimation process performed by the signal processing unit 4 will be described with reference to a flowchart in FIG. 5. The present process is started at each measurement cycle in which the radar waves are transmitted and received, while an ignition switch is turned on. Here, an example in which the axial misalignment angle αv in the vertical direction is estimated will be described below.

When the present process is started, at step S10, the signal processing unit 4 acquires the reflection point information from the radar apparatus 2. Hereafter, the reflection point that is identified from the reflection point information is referred to as an acquired reflection point.

At step S15, the signal processing unit 4 acquires an own vehicle speed Cm from the onboard sensor group 3.

At step S20, the signal processing unit 4 extracts a stationary reflection point that is a reflection point at which the radar wave is reflected by a stationary object, among the acquired reflection points. Specifically, using the own vehicle speed Cm acquired at step S10, with the relative speed included in the reflection point information as q, a lower-limit speed threshold set in advance as ε1, and an upper-limit speed threshold set in advance as ε2, the acquired reflection point that satisfies expression (1) is extracted as the stationary reflection point. That is, an acquired reflection point of which a ratio of the own vehicle speed Cm to the relative speed q is within a speed threshold range of ε1 to ε2 that is prescribed in advance is a stationary reflection point.

$$\varepsilon_1 < q/Cm < \varepsilon_2 \quad (1)$$

When a direction from the stationary reflection point towards the radar apparatus 2 and the beam direction coincide, because the own vehicle speed Cm and the relative speed q of the reflection point are of a same magnitude, and the direction of the relative speed q is opposite that of the own vehicle speed Cm, q/Cm=−1. In this manner, the reflection point in which q/Cm=−1 is considered to be a stationary reflection point.

However, the own vehicle speed Cm that is acquired from the onboard sensor group 3 does not necessarily coincide with an actual vehicle speed as a result of slipping of wheels and the like. In addition, the relative speed q that is detected by the radar apparatus 2 also includes error. Therefore, even when the reflection point is a stationary reflection point, q/Cm=−1 is not necessarily established. The lower-limit speed threshold ε1 and the upper-limit speed threshold ε2 that are set as appropriate taking into consideration effects of the foregoing are used.

Figure 10:
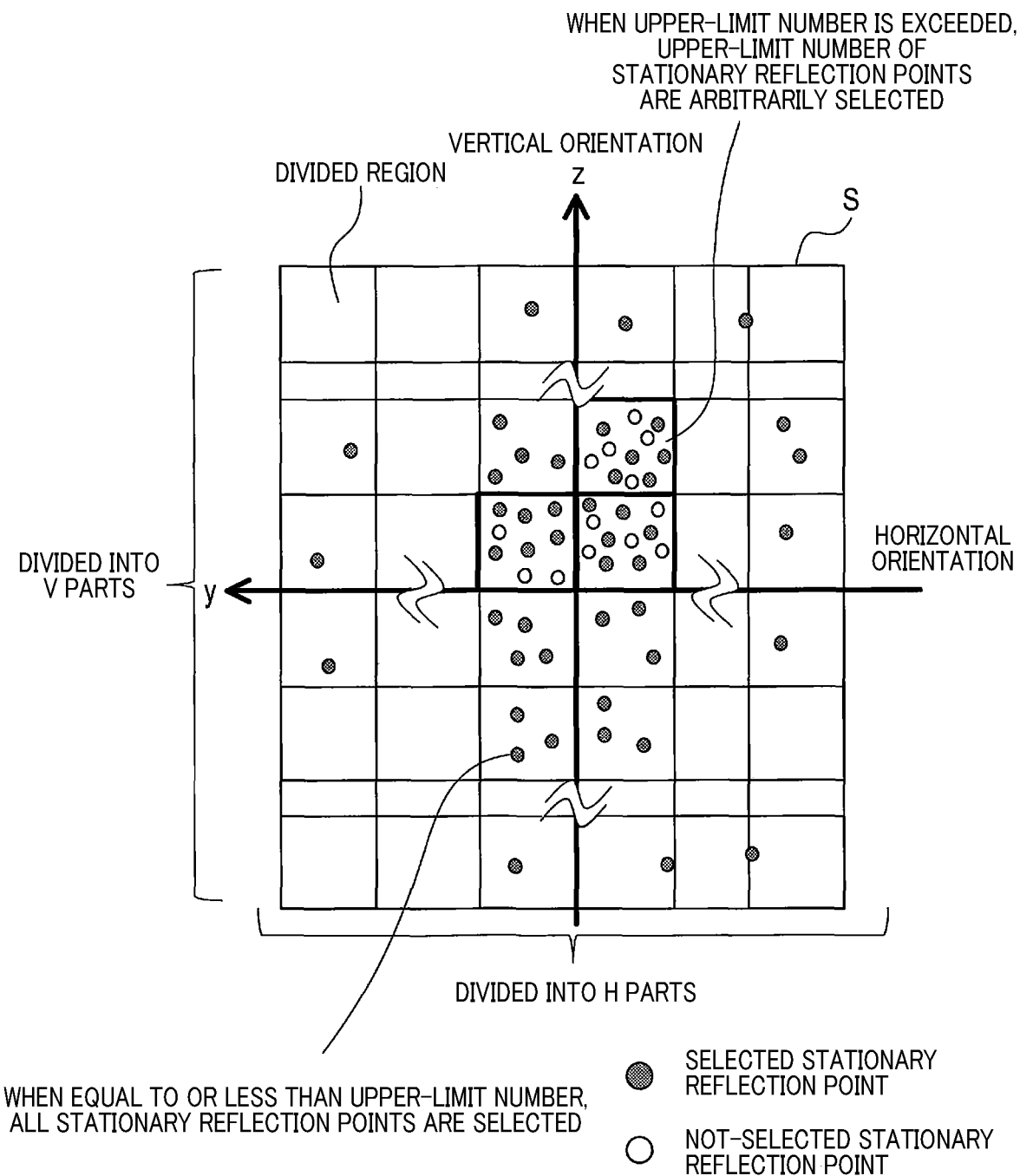
FIG. 10 is an explanatory diagram of the bias suppression process.
Figure 12:
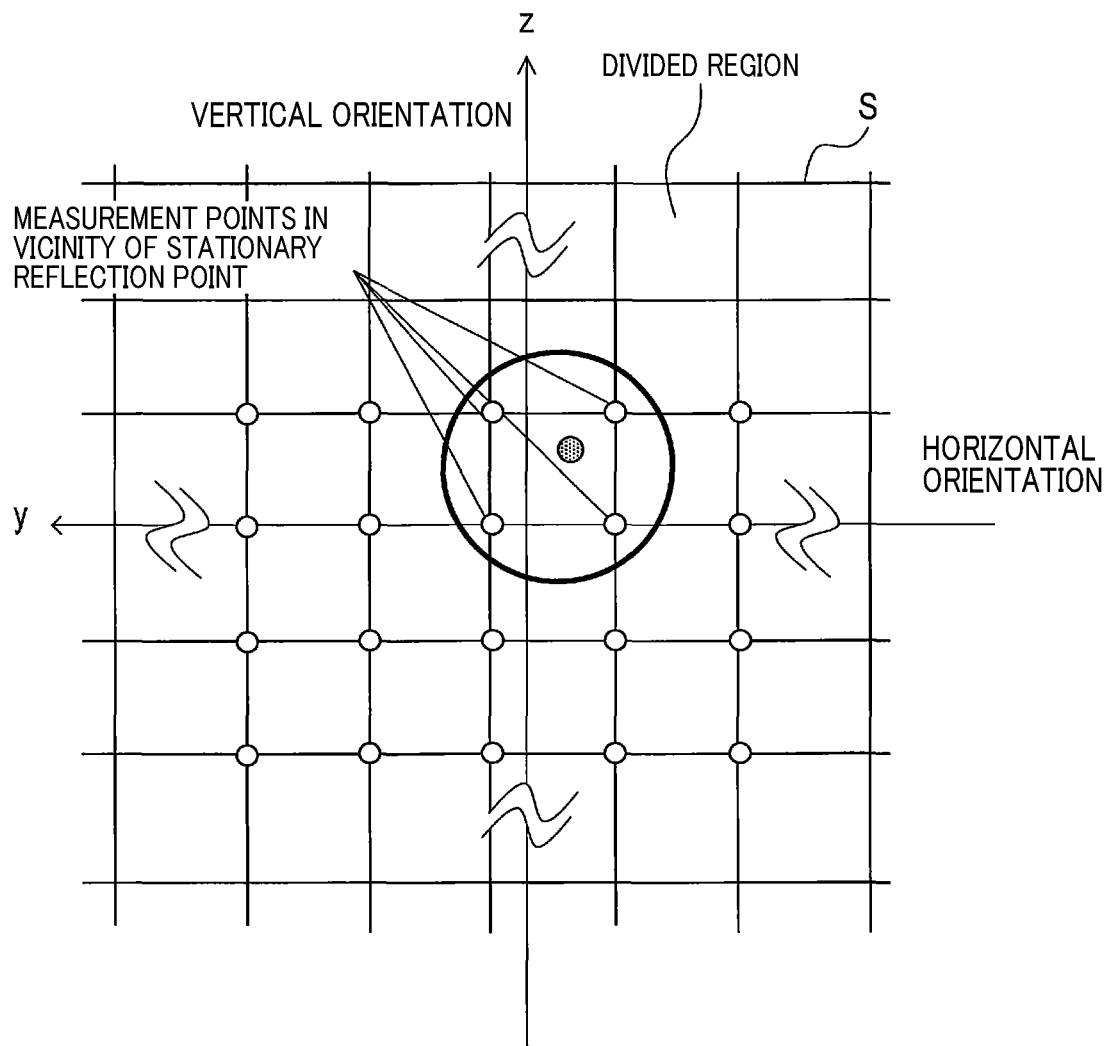
FIG. 12 is an explanatory diagram for explaining the error suppression process.

At step S25, the signal processing unit 4 performs a selection process. In the selection process, as shown in FIG. 10 and FIG. 12 described hereafter, for each divided region, the stationary reflection points that are included in the divided region are selected such that a predetermined condition is met, the divided region being an orientation region that is a detection region of the radar apparatus 2 divided into a plurality of parts in the horizontal direction and the vertical direction. Details of the selection process will be described hereafter. A number (hereafter, a selected number) of stationary reflection points that are selected in the present selection process is K. In addition, a selected stationary point hereafter refers to the stationary reflection point that is selected in the present selection process.

At step S30, the signal processing unit 4 estimates the axial misalignment angle αv in the vertical direction using the K selected stationary points selected at step S25. For example, the signal processing unit 4 estimates the axial misalignment angle αv in the vertical direction using expression (2).

$$\frac{q_v}{Cm_v} = A_v \cos(\theta_{ver}) = A_v \cos(\theta'_{ver} + \alpha_v) \quad (2)$$

In expression (2): θver is a measurement value of the vertical angle Ver when axial misalignment is not present in the radar apparatus 2, and θ'ver is a measurement value of the vertical angle Ver by the radar apparatus 2; qv is a magnitude of the relative speed q of the selected stationary point on the x-z plane; Cmv is a magnitude of the own vehicle speed Cm on the x-z plane; and Av is a magnitude of an error in speed of the vehicle VH on the x-z plane.

Based on expression (2), for each selected stationary point, an equation in which the axial misalignment angle αv and the error in speed of the vehicle VH are unknown parameters is obtained. That is, K simultaneous equations are obtained. As a result of the simultaneous equations being solved, αv and Av are determined. For example, as a specific solution for the simultaneous equations, a least-squares method can be used. However, this is not limited thereto.

Figure 6:
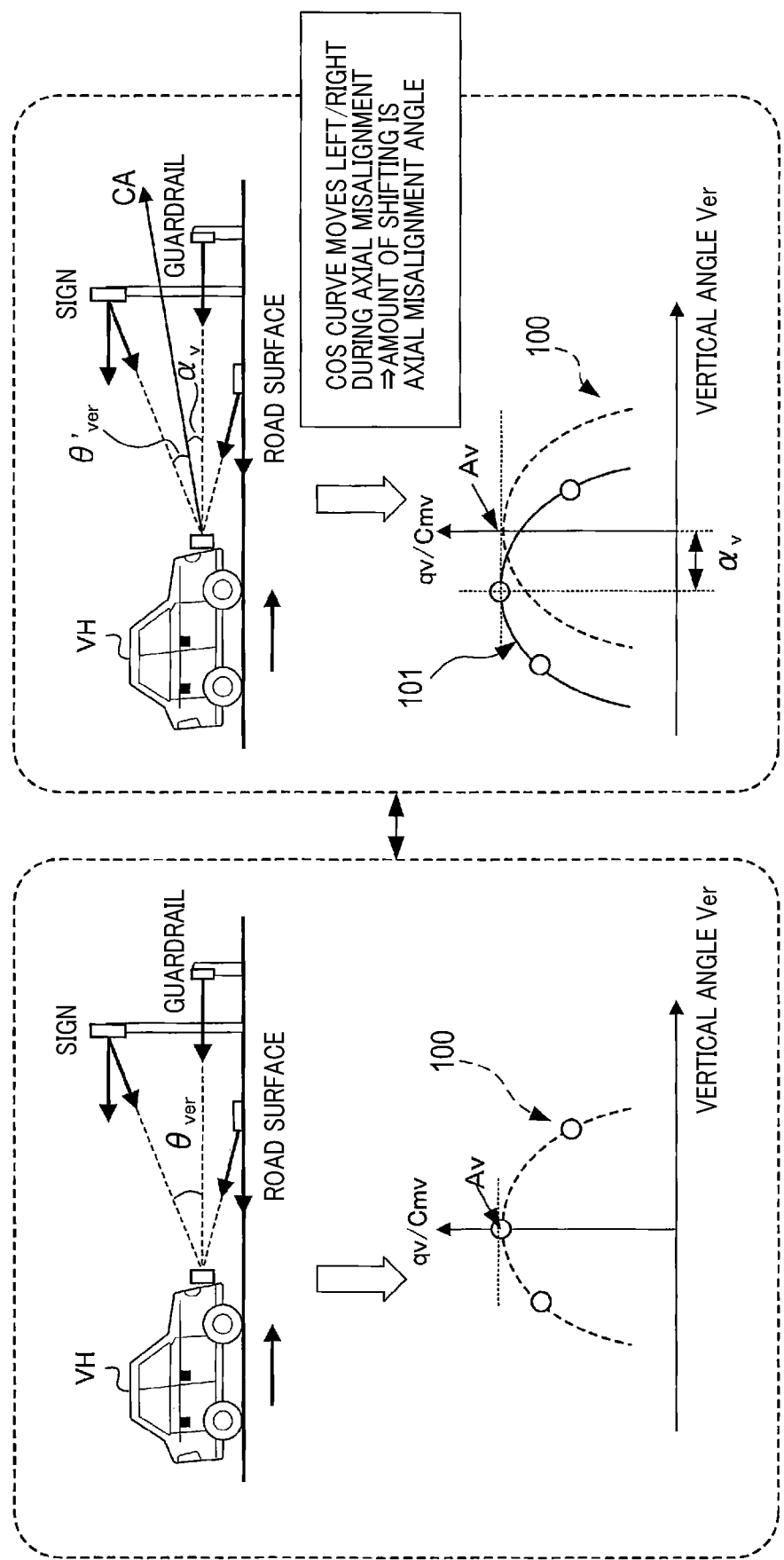
FIG. 6 is an explanatory diagram for explaining principles of estimation of an axial misalignment angle.

Here, for example, FIG. 6 is a graph that shows an area over which the stationary reflection points are present when a horizontal axis is the vertical angle Vr and a vertical axis is qv/Cmv. When the orientation angle in the vertical direction and qv/Cmv for each stationary reflection point are projected and plotted in a coordinate system shown in FIG. 6, if axial misalignment is not present in the radar apparatus 2, and if the beam direction and the advancing direction coincide, the stationary reflection points are plotted on a semicircle 100.

Meanwhile, when axial misalignment is present in the radar apparatus 2, the stationary reflection points are plotted on a semicircle 101 that is the semicircle 100 when axial misalignment is not present that is horizontally moved in a horizontal-axis direction by an amount that amounts to the axial misalignment angle αv. Solving the simultaneous equations in expression (2) corresponds to determining optimal αv and Av such that all K stationary reflection points are plotted on the semicircle 101.

Here, the signal processing unit 4 can estimate the misalignment angle αh in the horizontal direction by similar estimation using expression (3). Axial misalignment in the horizontal direction refers to axial misalignment on an x-y plane that is a horizontal plane.

$$\frac{q_h}{Cm_h} = A_h \cos(\theta_{har}) = A_h \cos(\theta'_{har} + \alpha_h) \quad (3)$$

In expression (3): θhor is a measurement value of the horizontal angle Hor when axial misalignment is not present in the radar apparatus 2; θ'hor is a measurement value of the horizontal angle Hor by the radar apparatus 2; qh is a magnitude of the relative speed q on the x-y plane; Cmh is a magnitude of the own vehicle speed Cm on the x-y plane; and Ah is a magnitude of the error in speed of the vehicle VH on the x-y plane.

Figure 7:
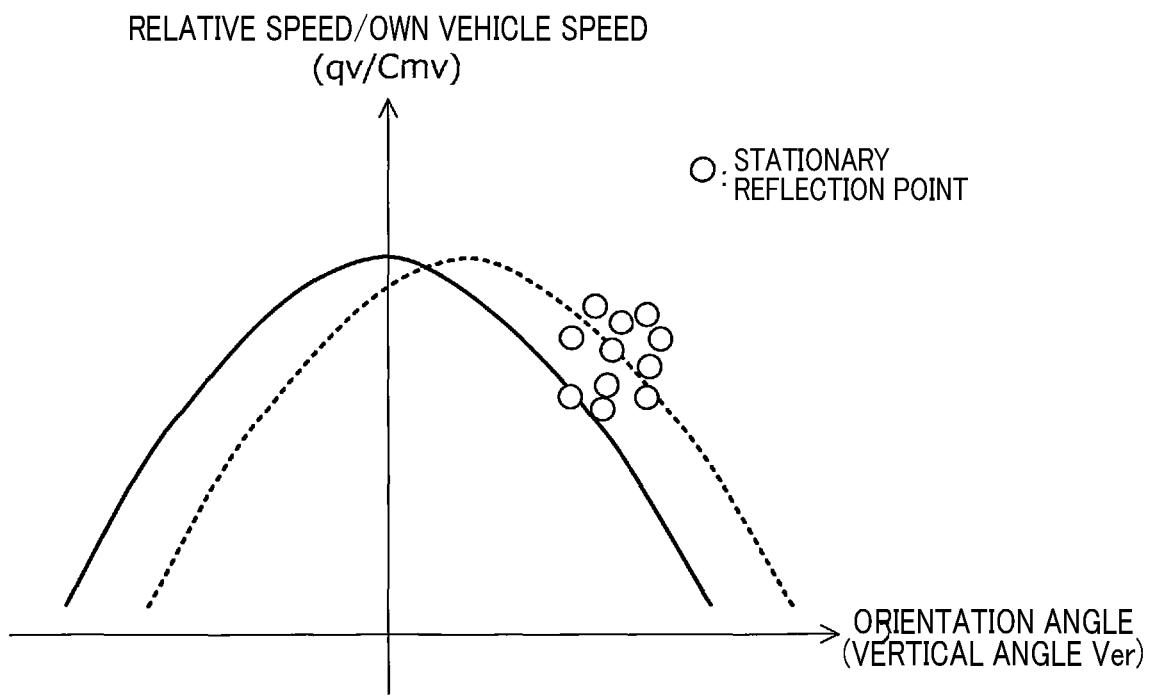
FIG. 7 is an explanatory diagram for explaining a manner in which stationary reflection points are biased towards a specific orientation angle at which detection accuracy is low.

Here, in the radar apparatus 2, detection accuracy regarding the orientation angle is dependent on the orientation. In general, the detection accuracy regarding the orientation angle decreases farther from the beam direction. That is, the detection accuracy decreases as an absolute value of a detection value becomes greater than 0 for both the vertical angle Ver and the horizontal angle Hor. Therefore, for example, as shown in FIG. 7, when the stationary reflection points are biased towards a certain orientation angle of which the detection accuracy is poor, estimation accuracy may decrease when the axial misalignment angle αv is estimated based on all of these stationary reflection points.

Therefore, at steps S25 to S30, by performing the above-described selection process, the signal processing unit 4 extracts the stationary reflection points that meet a predetermined condition, that is, the selected stationary points, among all of the stationary reflection points, and estimates the axial misalignment angle αv based on the extracted selected stationary points.

At step S35, the signal processing unit 4 identifies an estimation reliability level of the axial misalignment angle αv estimated at step S30. The estimation reliability level is a numeric value that indicates a degree of reliability of the axial misalignment angle αv estimated at step S30. According to the present embodiment, the selected number K that is the number of selected stationary points used to estimate the axial misalignment angle at step S30 is identified as the estimation reliability level.

At step S40, the signal processing unit 4 determines whether the axial misalignment angle αv estimated at step S30 is a reliable value. As described above, the axial misalignment angle αv is estimated using the K stationary reflection points. When the selected number K is equal to or greater than a reliability threshold that is prescribed in advance, the signal processing unit 4 determines that the estimated axial misalignment angle αv is a reliable value.

When the selected number K is less than the reliability threshold, the signal processing unit 4 determines that the estimated axial misalignment angle αv is not reliable and shifts the process to step S45. When the selected number K is equal to or greater than the reliability threshold, the signal processing unit 4 determines that the estimated axial misalignment angle αv is reliable and shifts the process to step S55.

At step S45, the signal processing unit 4 determines whether directivity of the radar apparatus 2 is to be changed. As described above, the radar apparatus 2 is configured to receive the reflected waves by the array antennas. When the axial misalignment angle αv estimated at step S30 is within an adjustable range of directivity by the array antennas, the signal processing unit 4 determines that the directivity of the array antennas is to be changed. When the directivity is to be changed, the signal processing unit 4 shifts the process to step S50. When the directivity is not to be changed, the signal processing unit 4 ends the present axial misalignment estimation process.

At step S50, the signal processing unit 4 performs a process to change the directivity of the array antennas by an adjustment angle that is prescribed in advance. Then, the signal processing unit 4 ends the present axial misalignment estimation process.

At step S55, the signal processing unit 4 determines whether the axial misalignment angle αv estimated at step S30 is can be adjusted by the mounting angle adjustment apparatus 52. The signal processing unit 4 determines that axial misalignment adjustment can be performed when the axial misalignment angle αv is within an adjustable range that is set in advance. When axial misalignment adjustment can be performed, the signal processing unit 4 shifts the process to step S65. When axial misalignment adjustment cannot be performed, the signal processing unit 4 shifts the process to step S60.

At step S60, the signal processing unit 4 outputs diagnostic information (hereafter, axial misalignment diagnosis) that indicates that the center axis CA of the radar apparatus 2 is misaligned to an apparatus outside the signal processing unit 4. For example, the signal processing unit 4 may be configured to output the axial misalignment diagnosis to the axial misalignment notification apparatus 51, and the axial misalignment notification apparatus 51 may be configured to output a warning sound based on the axial misalignment diagnosis. Then, the signal processing unit 4 ends the present axial misalignment estimation process.

At step S65, the signal processing unit 4 adjusts a radar mounting angle such that the center axis CA of the radar apparatus 2 coincides with the advancing direction of the vehicle VH by rotating the radar apparatus 2 in the vertical direction around an axis along the front/rear direction of the vehicle VH by an amount amounting to the axial misalignment angle αv, by the mounting angle adjustment apparatus 52.

At subsequent step S70, the signal processing unit 4 calculates an orientation angle that is the orientation angle of the reflection point acquired at step S10 corrected by an amount amounting to the axial misalignment angle αv. Here, the signal processing unit 4 performs the above-described target recognition process based on the orientation angle after correction. The signal processing unit 4 thereby ends the axial misalignment adjustment process.

[2-2. Selection Process]

Figure 8:
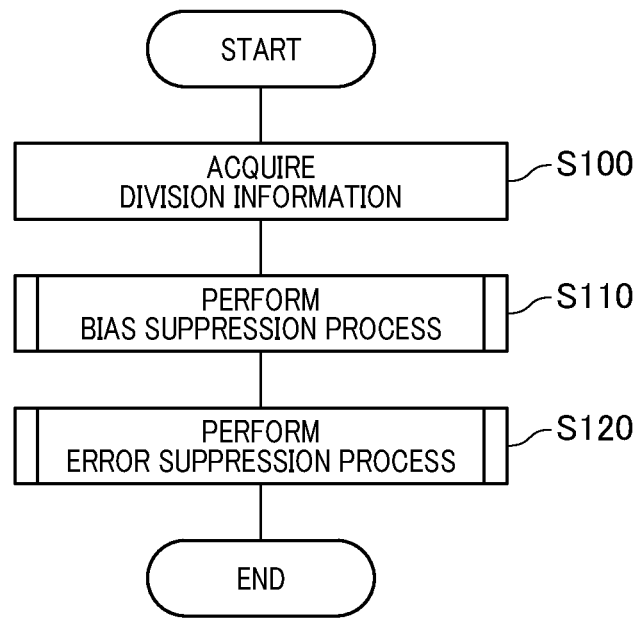
FIG. 8 is a flowchart of a selection process.

Next, the selection process performed at step S25 in the axial misalignment estimation process by the signal processing unit 4 will be described with reference to a flowchart in FIG. 8.

At step S100, the signal processing unit 4 acquires information on the divided region (division information). As shown in FIG. 10 and FIG. 12, the divided region is each of the regions after division when a predetermined irradiation region of the radar waves on a y-z plane (also referred to, hereafter, as a projection plane S) that is away from the radar apparatus 2 by a predetermined distance is divided into V parts in the vertical direction and H parts in the horizontal direction. According to the present embodiment, the divided region is square-shaped. The vertical direction herein is a z direction and the horizontal direction is a y direction. V and H are integers of 1 or more that are prescribed in advance and stored in the memory 42 in advance. According to the present embodiment, the description is given with V and H as integers that are 2 or more.

Orientation angles at four corners of each divided region on the projection plane S are indicated using the vertical angle and the horizontal angle. Measurement points hereafter refer to positions of the four corners of each divided region on the projection plane S. In FIG. 12, a position of the measurement point is indicated by a white circle.

Regarding each measurement point, detection error by the radar apparatus 2 at each measurement point is measured by an experiment, simulation, or the like in advance. Each divided region, the orientation angle of each measurement point of each divided region, and the detection error at each measurement point are associated with one another and stored in advance in the memory 42 as the division information. That is, the divided region in which each stationary reflection point is included can be identified based on the orientation angle of the stationary reflection point in the reflection point information and the division information.

At step S110, the signal processing unit 4 performs a bias suppression process. As a result of the bias suppression process, the signal processing unit 4 selects the stationary reflection points that are included in each divided region such that a condition is met. The condition is that the number of stationary reflection points included in a single divided region is equal to or less than an upper-limit number that is prescribed in advance. Details of the bias suppression process will be described hereafter.

At step S120, the signal processing unit 4 performs an error suppression process. As a result of the error suppression process, the signal processing unit 4 selects the stationary reflection points that are included in each divided region such that a condition is met. The condition is that the stationary reflection points included in a single divided region is selected based on selection probability described hereafter. Details of the error suppression process will be described hereafter. The signal processing unit 4 thereby ends the selection process.

In this manner, according to the present embodiment, the signal processing unit 4 further selects the stationary reflection points based on the selection probability in the error suppression process at step S120, from the stationary reflection points that are selected in the bias suppression process at step S110. That is, the stationary reflection points that have been selected so as to be equal to or less the upper-limit number in the bias suppression process are further selected based on the selection probability in the error suppression process. The K stationary reflection points that are selected in this manner by the bias suppression process and the error suppression process correspond to the above-described selected stationary points.

[2-3. Bias Suppression Process]

Figure 9:
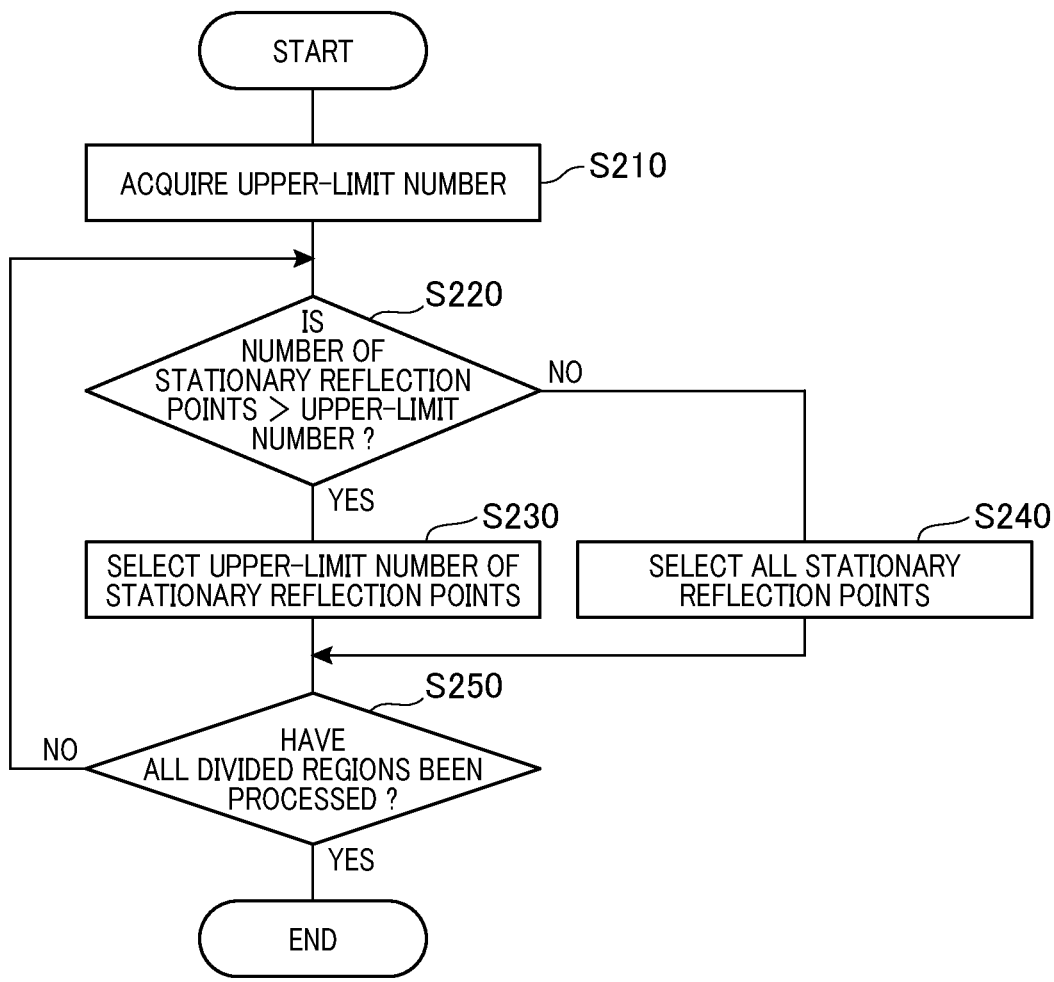
FIG. 9 is a flowchart of a bias suppression process.

Next, the bias suppression process performed at step S110 in the selection process by the signal processing unit 4 will be described with reference to a flowchart in FIG. 9 and FIG. 10.

At step S210, the signal processing unit 4 acquires the upper-limit number. The upper-limit number is a number that is prescribed in advance that indicates an upper limit of the number of stationary reflection points included in a single divided region. More specifically, the upper-limit number indicates an upper limit of the number of stationary reflection points that are used to estimate the axial misalignment angle in a single divided region. The upper-limit number is prescribed in advance for each divided region. Specifically, the upper-limit number is an integer of 1 or more and stored in advance in the memory 42. Here, according to the present embodiment, the upper-limit number of a same value is set for each divided region.

At steps S220 to S250, the signal processing unit 4 selects, from the stationary reflection points in the divided region, the upper-limit number of stationary reflection points or less based on the reflection point information, the division information, and the upper-limit number.

That is, at step S220, for a single divided region, the signal processing unit 4 determines whether the number of stationary reflection points detected in the divided region is greater than the upper-limit number that is set for the divided region. The single divided region herein is a divided region for which the processes at steps S220 to S250 have not been performed, among the plurality of divided regions.

Here, when the number of stationary reflection points detected in the divided region is greater than the upper-limit number, the signal processing unit 4 shifts the process to step S230. Meanwhile, when the number of stationary reflection points detected in the divided region is equal to or less than the upper-limit number, the signal processing unit 4 shifts the process to step S240.

At step S230, as shown in FIG. 10, the signal processing unit 4 selects the upper-limit-number of stationary reflection points from all of the stationary reflection points detected in the single divided region, and shifts the process to step S250.

When selecting the upper-limit number of stationary reflection points in the single divided region, the signal processing unit 4 may select an upper-limit number of arbitrary stationary reflection points from all of the stationary reflection points detected in the divided region. Here, according to the present embodiment, the signal processing unit 3 selects the upper-limit number of stationary reflection points in order from that closest to the radar apparatus 2 based on a distance R to the reflection point that is included in the reflection point information. FIG. 10 shows an example in which the upper-limit number is set to six.

At step S240, the signal processing unit 4 selects all stationary reflection points detected in the single divided region and shifts the process to step S250.

Here, at steps S230 and S240, the signal processing unit 4 associates, for each divided region, the division information of the divided region and the reflection point information of the selected stationary reflection points in the divided region, and stores the information in the memory 42.

At step S250, the signal processing unit 4 determines whether selection of the stationary reflection points is completed as indicated at steps S220 to S240 for all V×H divided regions. Here, when determined that selection of the stationary reflection points is not completed for all of the divided regions, the signal processing unit 4 shifts the process to S220 and repeats the processes at steps S220 to S250. Meanwhile, when determined that selection of the stationary reflection points is completed for all of the divided regions, the signal processing unit 4 ends the present bias suppression process.

[2-4. Error Suppression Process]

Figure 11:
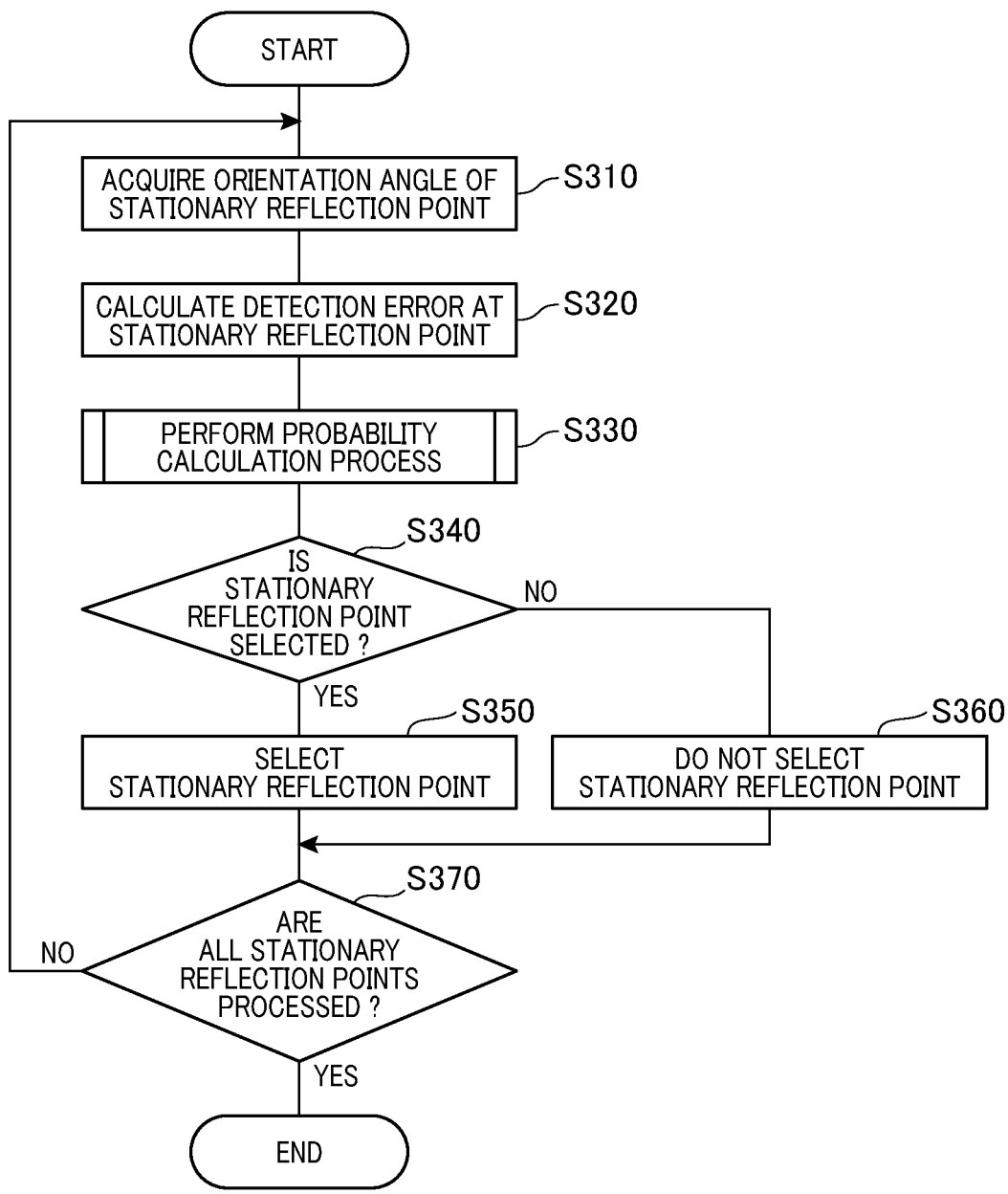
FIG. 11 is a flowchart of an error suppression process.

Next, the error suppression process performed at step S120 in the selection process by the signal processing unit 4 will be described with reference to a flowchart in FIG. 11 and FIG. 12. Here, the stationary reflection point hereafter refers to the stationary reflection point selected at step S110 in the selection process according to the present embodiment.

At step S310, the signal processing unit 4 acquires the orientation angle of the stationary reflection point based on the reflection point information.

At step S320, the signal processing unit 4 estimates the detection error in the orientation angle by the radar apparatus 2 at the stationary reflection point. As described above, the detection error by the radar apparatus 2 is measured in advance at each measurement point for each divided region. For example, a unit of the detection error is expressed by a same unit as the orientation angle, such as ±some degrees.

The orientation angle that indicates the position of the measurement point and the detection error are associated with each other and stored in the memory 42 as the above-described division information. Here, according to the present embodiment, the signal processing unit 4 identifies the measurement points of the divided region that includes the stationary reflection point based on the division information. Then, the signal processing unit 4 acquires the detection errors at the measurement points in the four corners of the divided region (that is, the four measurement points near the stationary reflection point), calculates an average value thereof, and uses the average value as the detection error in the stationary reflection point.

At step S330, the signal processing unit 4 performs a probability calculation process. As a result of the probability calculation process, the signal processing unit 4 calculates the selection probability. The selection probability indicates a probability of the stationary reflection point that is included in a single divided region being selected in the divided region. The selection probability herein is a numeric value that is 1 or less, and is a value that decrease as the detection error by the radar apparatus 2 increases. Details of the probability calculation process will be described hereafter.

At step S340, the signal processing unit 4 determines whether the stationary reflection point is selected based on the selection probability calculated at step S330. Here, according to the present embodiment, the signal processing unit 4 generates a random number within a range that is greater than 0 and equal to or less than 1. The signal processing unit 4 determines that the stationary reflection point is selected when the generated random number is equal to or less than the selection probability, and determines that the stationary reflection point is not selected when the generated random number is greater than the selection probability. When determined that the stationary reflection point is selected, the signal processing unit 4 shifts the process to step S350. When determined that the stationary reflection point is not selected, the signal processing unit 4 shifts the process to step S360.

According to the present embodiment, at step S350, the signal processing unit 4 stores the stationary reflection point that is determined to be selected in the memory 42 as the selected stationary point and shifts the process to step S370.

At step S360, the signal processing unit 4 shifts the process to step S370 without storing the stationary reflection point that is determined to not be selected in the memory 42 as the selected stationary point.

At step S370, the signal processing unit 4 determines whether the processes at steps S310 to S360 have been performed for all of the stationary reflection points. Here, when determined that the processes have not been performed for all of the stationary reflection points, the signal processing unit 4 shifts the process to step S310 and repeats the processes at steps S310 to S370. Meanwhile, when determined that the processes have been performed for all of the stationary reflection points, the signal processing unit 4 ends the present error suppression process.

[2-5. Probability Calculation Process]

Figure 13:
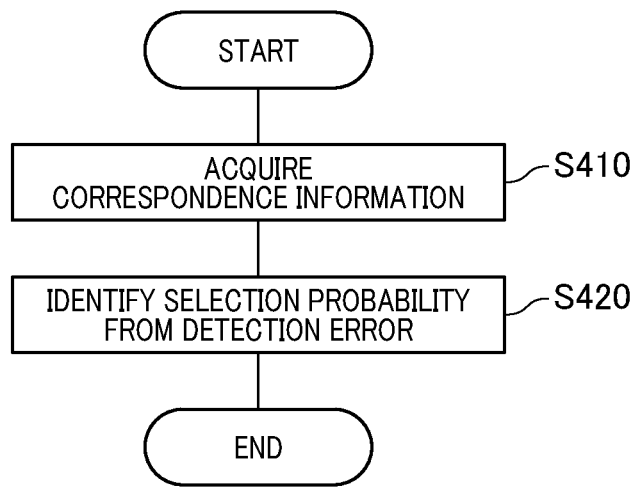
FIG. 13 is a flowchart of a probability calculation process.

Next, the probability calculation process performed at step S330 in the error suppression process by the signal processing unit 4 will be described with reference to a flowchart in FIG. 13.

At step S410, the signal processing unit 4 acquires correspondence information. The correspondence information is information that indicates correspondence between the selection probability and the detection error. In the correspondence information, the selection probability and the detection error are associated with the selection probability being a numeric value that is equal to or greater than 0 and equal to or less than 1, and a numeric value that decreases as the detection error increases.

Figure 14:
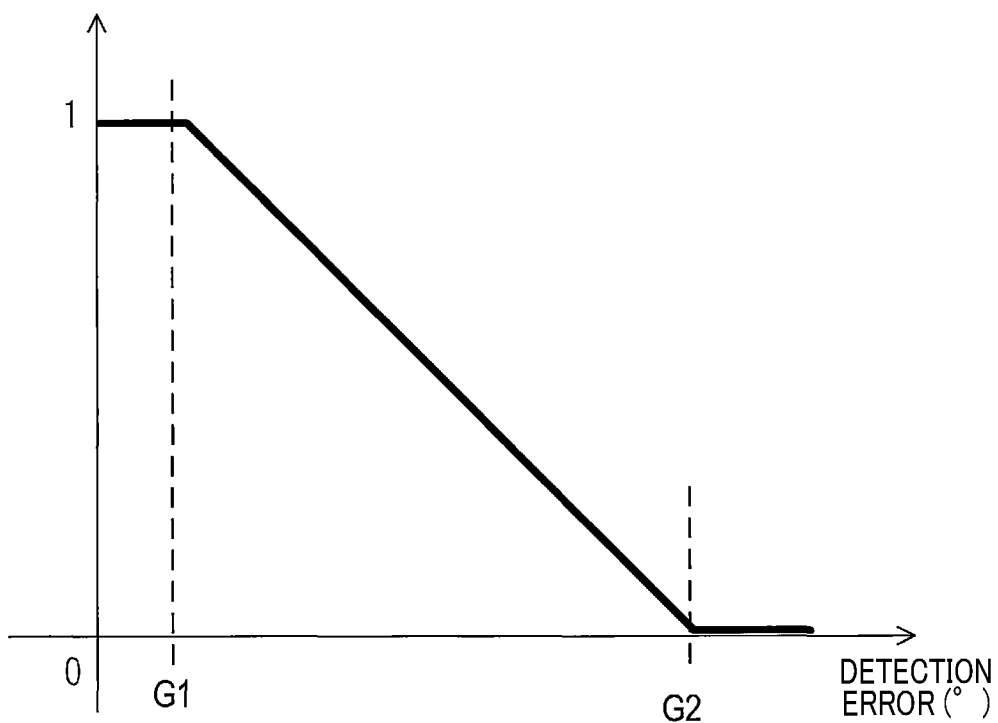
FIG. 14 is an explanatory diagram for explaining an example of association between selection probability and detection error.

For example, as shown in FIG. 14, in the correspondence information, association may be made such that the selection probability is 1 when the detection error is less than a first detection error G1 that is prescribed in advance and the selection probability is 0 when the detection error is equal to or greater than a second detection error G2 that is prescribed in advance. In addition, the association may be made such that the selection probability gradually decreases from 1 to 0 when the detection error is equal to or greater than the first detection error G1 and less than the second detection error G2.

However, in the present disclosure, the correspondence information is not limited thereto and may be arbitrarily set. According to the present embodiment, the correspondence information is information in a table format. The correspondence information is stored in the memory 42 in advance. However, the correspondence information may be expressed by an expression.

At step S420, the signal processing unit 4 identifies the selection probability that corresponds to the detection error at the stationary reflection point based on the correspondence information. The signal processing unit 4 stores the selection probability in the memory 42 and ends the present probability calculation process.

3. Effects

According to the first embodiment described in detail above, the following effects are obtained.

(3a) At step S25, for each divided region, the signal processing unit 4 is configured to select the stationary reflection points that are included in the divided region such that a predetermined condition is met. At step S30, the signal processing unit 4 is configured to determine the axial misalignment angle using the stationary reflection points selected at step S25.

In the radar apparatus 2, there may an orientation at which detection accuracy regarding the orientation angle is high and an orientation at which the detection accuracy is low. In general, the detection accuracy regarding the orientation angle increases closer to the center axis CA. The detection accuracy regarding the orientation angle decreases farther from the center axis CA. A target that is detected by the radar apparatus 2 is not necessarily detected at an orientation near the center axis CA of the radar apparatus 2 and may be detected so as to be biased towards an orientation away from the center axis CA.

That is, as a result of detection error in the orientation angle by the radar apparatus 2, bias in a distribution of the detected target, and the like, estimation accuracy regarding the axial misalignment angle may decrease due to effects of the detection error by the radar apparatus 2 regarding the orientation. In particular, when the target is detected so as to be biased towards an orientation that is away from the center axis CA, because numerous reflection points that are used for the estimation of the axial misalignment angle are detected so as to be biased towards an orientation away from the center axis CA, the estimation accuracy regarding the axial misalignment angle may further decrease.

In the present disclosure, the signal processing unit 4 selects the stationary reflection points that are used for estimation of the axial misalignment angle for each divided region when a predetermined condition is met. Therefore, as a result of the condition being appropriately set, the number of stationary reflection points in the divided region can be reduced. That is, as a result of the condition being appropriately set, the number of stationary reflection points that are used for estimation of the axial misalignment angle can be reduced based on detection characteristics of the orientation angle of the radar apparatus 2.

As a result, because the effects of the detection error by the radar apparatus 2 regarding the orientation are suppressed, decrease in estimation accuracy regarding the axial misalignment angle can be suppressed.

(3b) At step S110, the signal processing unit 4 may be configured to select the stationary reflection points that are included in the divided region such that a condition that the number of stationary reflection points included in the divided region is equal to or less than the upper-limit number is met. As a result, the number of stationary reflection points that are used in the estimation of the axial misalignment angle can be reduced to equal or less than the upper-limit number for each divided region. Effects similar to those in (3a) can be obtained.

Here, the upper-limit number may be the same value for each divided region. As a result, effects similar to those in (3a) can be obtained with a simple configuration.

(3c) At step S320, the signal processing unit 4 may be configured to estimate the detection error by the radar apparatus 2 at the stationary reflection point. At step S330, the signal processing unit 4 may be configured to calculate the selection probability of the stationary reflection point being used in the estimation of the axial misalignment angle as a numeric value that is equal to or greater than 0 and equal to or less than 1, and a numeric value that decreases as the detection error by the radar apparatus 2 increases. At step S340, the signal processing unit 4 may be configured to select the stationary reflection points that are included in the divided region such that a condition that the number of stationary reflection points included in the divided region is selected based on the selection probability is met.

As a result, the number of stationary reflection points that are used in the estimation of the axial misalignment angle can be reduced as the detection error increases, for each orientation region. In addition, effects similar to those in (3a) can be obtained.

(3d) The detection error is prescribed in advance for each divided region and stored in the memory 42. At step S320, the signal processing unit 4 may be configured to estimate the detection error at the stationary reflection points included in the divided region, based on the stored detection error. As a result, because the selection probability is calculated based on the detection error that is estimated for each divided region, orientation dependence of the detection error by the radar apparatus 2 can be reflected in the selection probability that is calculated. In addition, effects similar to those in (3a) can be obtained.

Here, the detection errors at the measurement points that are the positions of the four corners in each divided region may be prescribed in advance for each divided region. At step S320, the signal processing unit 4 may be configured to estimate the detection error at the stationary reflection point based on the detection errors at the measurement points in the four corners of the divided region to which the stationary reflection point belongs (that is, that includes the stationary reflection point). The detection error at each measurement point may be set in advance by an experiment or the like. As a result, orientation dependence of the detection error by the radar apparatus 2 can be more accurately reflected in the selection probability that is calculated.

(3e) At step S330, the signal processing unit 4 may be configured to identify the selection probability based on the correspondence information. The correspondence information is the correspondence information that indicates the correspondence between the selection probability and the detection error, and is information in which the selection probability is associated with the detection error as a numeric value that is equal to or greater than 0 and equal to or less than 1 and a numeric value that decreases as the detection error increases. As a result, the selection probability that is based on the identification of the radar apparatus 2 can be identified.

(3f) At step S30, the signal processing unit 4 may be configured to estimate unknown parameters, with an error A in speed of a moving body and the axial misalignment angle αv as the unknown parameters. Specifically, the signal processing unit 4 may be configured to estimate the unknown parameters using a relational expression based on the reflection point information acquired at step S10. The relational expression is an expression that is established between the unknown parameters, the orientation angle, and q/Cm that is a value obtained by the relative speed at the reflection point being divided by the speed of the moving body. As a result, the axial misalignment angle can be estimated arithmetically, that is, by simultaneous equations being solved.

4. Other Embodiments

An embodiment of the present disclosure is described above. However, the present disclosure is not limited to the above-described embodiment and can be modified in various ways.

(4a) According to the above-described embodiment, the signal processing unit 4 is configured to perform both a bias suppression process and the error suppression process in this order in the selection process at step S25. However, the present disclosure is not limited thereto. The signal processing unit 4 may perform the error suppression process in the selection process, and subsequently further perform the bias suppression process. In this case, the stationary reflection point in the bias suppression process refers to the stationary reflection point that is selected in the error suppression process.

In addition, the signal processing unit 4 may be configured to perform at least either of the bias suppression process and the error suppression process in the selection process. When the bias suppression process is not performed, the signal processing unit 4 may be configured such that step S110 in FIG. 8 is eliminated. When the error suppression process is not performed, the signal processing unit 4 may be configured such that step S120 in FIG. 8 is eliminated.

(4b) According to the above-described embodiment, the signal processing unit 4 is configured to estimate the axial misalignment angle αv in the vertical direction at step S30. However, the present disclosure is not limited thereto. At step S30, the signal processing unit 4 may be configured to estimate at least either (that is, either or both) of the axial misalignment angle αv in the vertical direction and the axial misalignment angle αh in the horizontal direction.

(4c) When selecting the upper-limit number of stationary reflection points at step S230, the signal processing unit 4 may be configured to select the upper-limit number of stationary reflection points in order from that which has greatest reflection intensity, from all of the stationary reflection points detected in the divided region.

(4d) According to the above-described embodiment, the signal processing unit 4 sets the same upper-limit number for all divided regions. However, the present disclosure is not limited thereto. For example, the upper-limit value may be the same upper-limit value or may be differing upper limit values in the divided regions. In addition, the upper-limit value may be dynamically set. For example, in the axial misalignment estimation process, the number of detection targets (that is, the number of stationary observation points) in the cycle is N, the number of divided regions is M (that is, M=V×H), and a coefficient is k. The signal processing unit 4 may set a value that is equal to or greater than k×(N/M) as the upper-limit number, based on N/M that is an average number of targets per single divided region.

In addition, it is thought that, in the radar apparatus 2, the detection accuracy increases closer to the beam direction. Therefore, for example, the upper-limit number of the divided region that is close to the beam direction may be set to a larger numeric value than the upper-limit number of the divided region that is away from the beam direction. That is, the upper limit number may be set to decrease towards a wide angle side in the irradiation region of the radar beam by the radar apparatus 2.

In these cases, information in which the orientation angle or coordinates that indicate the divided region, and the upper-limit number of the divided region that is indicated by the orientation direction or the coordinates are associated may be stored in advance in the memory 42.

(4e) according to the above-described embodiment, the divided region has a square shape on the projection plane S. However, the present disclosure is not limited thereto. The divided region is merely required to be a region after division in which the irradiation region of the radar wave on the projection plane S is divided in a grid-like manner. For example, the divided region may have a rectangular shape on the projection plane S. In addition, for example, the divided region may have a polygonal shape such as a triangular shape or a hexagonal shape, or an arbitrary shape such as a circular shape or an elliptical shape on the projection plane S.

(4f) According to the above-described embodiment, the signal processing unit 4 uses the average value of the detection errors at the measurement points in the four corners of the divided region that includes the stationary reflection point as the detection error at the stationary reflection point. However, the present disclosure is not limited thereto. For example, rather than merely an average value, the detection error at the stationary reflection point may be calculated by an average value that is weighted based on distances from the stationary reflection point to the measurement points in the four corners.

(4g) The antenna unit that is provided in the radar apparatus 2 need not be the array antennas of which the directivity can be adjusted. When the directivity of the antenna unit cannot be adjusted, the signal processing unit 4 may be configured such that steps S45 and S50 are omitted, and the axial misalignment estimation process is ended when a negative determination is made at step S40.

(4h) The signal processing unit 4 may be configured to output the axial misalignment diagnosis when the directivity of the radar apparatus 2 is changed. In this case, the signal processing unit 4 may be configured to output the axial misalignment diagnosis in a manner similar to that at step S60 after performing step S50. In addition, the signal processing unit 4 may be configured to not output the axial misalignment diagnosis. In this case, the signal processing unit 4 may be configured such that step S60 is eliminated.

(4i) According to the above-described embodiment, the signal processing unit 4 generates the reflection point information that includes both the horizontal angle and the vertical angle as the orientation angle of the reflection point. However, the present disclosure is not limited thereto. The signal processing unit 4 may generate the reflection point information that includes only the horizontal angle or may generate the reflection point information that includes only the vertical angle.

(4j) According to the above-described embodiment, an aspect in which the radar apparatus 2 transmits the radar waves towards the front of the vehicle VH is described. However, a transmission direction of the radar waves is not limited to the front of the vehicle VH. For example, the radar apparatus 2 may be configured to transmit the radar waves towards at least one of the front, front right, front left, rear, rear right, rear left, right, and left of the vehicle VH.

(4k) According to the above-described embodiment, an example in which the radar apparatus 2 uses the FMCW system is described. However, the radar system of the radar apparatus 2 is not limited to the FMCW. For example, the radar apparatus 2 may be configured to use dual-frequency CW, FCM, or pulses. FCM is an abbreviation of Fast-Chirp Modulation.

(4l) According to the above-described embodiment, an example in which the signal processing unit 4 performs the axial misalignment adjustment process is described. However, the radar apparatus 2 may be configured to perform the axial misalignment adjustment process.

(4m) The signal processing unit 4 and the method thereof described in the present disclosure may be actualized by a dedicated computer that is provided so as to be configured by a processor and a memory, the processor being programmed to provide one or a plurality of functions that are realized by a computer program. Alternatively, the signal processing unit 4 and the method thereof described in the present disclosure may be actualized by a dedicated computer that is provided by a processor being configured by a single dedicated hardware logic circuit or more. Still alternatively, the signal processing unit 4 and the method thereof described in the present disclosure may be actualized by a single dedicated computer or more. The dedicated computer may be configured by a combination of a processor that is programmed to provide one or a plurality of functions, a memory, and a processor that is configured by a single hardware logic circuit or more. In addition, the computer program may be stored in a non-transitory tangible recording medium that can be read by a computer as instructions performed by the computer. A method for actualizing functions of sections that are included in the signal processing unit 4 is not necessarily required to include software. All of the functions may be actualized using a single or a plurality of pieces of hardware.

(4n) A plurality of functions provided by a single constituent element according to the above-described embodiments may be actualized by a plurality of constituent elements. A single function provided by a single constituent element may be actualized by a plurality of constituent elements. In addition, a plurality of functions provided by a plurality of constituent elements may be actualized by a single constituent element. A single function provided by a plurality of constituent elements may be actualized by a single constituent element. Furthermore, a part of a configuration according to the above-described embodiments may be omitted. Moreover, at least a part of a configuration according to an above-described embodiment may be added to or replace a configuration according to another of the above-described embodiments.

(4o) The present disclosure can also be actualized by various modes in addition to the above-described signal processing unit 4, radar apparatus 2, and vehicle control system 1, such as a program for enabling function as the signal processing unit 4, a non-transitory, tangible recording medium such as a semiconductor memory that records the program therein, and an axial misalignment estimation method.

Here, according to the above-described embodiments, the signal processing unit 4 corresponds to the axial misalignment estimation apparatus. In addition: step S10 corresponds to a process as an acquiring unit; step S20 corresponds to a process as an extracting unit; steps S25, S110, and S120 correspond to processes as a selecting unit; step S30 corresponds to a process as an axial misalignment calculating unit; step S320 corresponds to a process as an error estimating unit; step S330 corresponds to a process as a probability calculating unit; and step S340 corresponds to a process at a selection executing unit. In addition, the vehicle VH corresponds to a moving body.

What is claimed is:

1. An axial misalignment estimation apparatus that estimates an axial misalignment angle of a radar apparatus that is mounted in a moving body, the axial misalignment estimation apparatus comprising:

an acquiring unit that is configured to repeatedly acquire, for each reflection point that is detected by the radar apparatus, reflection point information that includes at least a relative speed between the radar apparatus and the reflection point, and an orientation angle that is an orientation angle of the reflection point and is at least either of a horizontal angle and a vertical angle that are determined with reference to a beam direction that is a direction along a center axis of a radar beam;

an extracting unit that is configured to acquire a speed of the moving body and extract a stationary reflection point that is estimated to be a stationary object from the reflection points based on the speed of the moving body;

a selecting unit that is configured to select, for each divided region, the stationary reflection point that is included in the divided region such that a predetermined condition is met, the divided region being a detection region of the radar apparatus that is divided into a plurality of parts in at least either of a horizontal direction and a vertical direction; and an axial misalignment calculating unit that is configured to determine the axial misalignment angle using the stationary reflection point selected by the selecting unit, wherein:

the selecting unit is configured to include an error estimating unit that is configured to estimate a detection error by the radar apparatus at the stationary reflection point, a probability calculating unit that is configured to calculate, as a numeric value that decreases as the detection error increases, selection probability of the stationary reflection point being used by the axial misalignment calculating unit, and a selection executing unit that is configured to select the stationary reflection point that is included in the divided region such that a condition is met, the condition being that a number of stationary reflection points that are included in the divided region is selected based on the selection probability.

2. The axial misalignment estimation apparatus according to claim 1, wherein:

the selecting unit is configured to select the stationary reflection point that is included in the divided region such that a condition is met, the condition being that a number of stationary reflection points that are included in the divided region is equal to or less than an upper-limit number that is prescribed in advance.

3. The axial misalignment estimation apparatus according to claim 1, wherein:

the detection error is prescribed in advance for each divided region; and the error estimating unit is configured to estimate a detection error by the radar apparatus at the stationary reflection point, that is included in the divided region, based on the prescribed detection error.

4. The axial misalignment estimation apparatus according to claim 3, wherein:

the probability calculating unit is configured to acquire correspondence information that indicates a correspondence between the selection probability and the prescribed detection error and in which the selection probability is associated with the prescribed detection error as a numeric value that decreases as the prescribed detection error increases, and identify the selection probability based on the correspondence information.

5. The axial misalignment estimation apparatus according to claim 4, wherein:
with an error in speed of the moving body and the axial misalignment angle as unknown parameters, the axial misalignment calculating unit is configured to estimate the unknown parameters using a relational expression that is established between the unknown parameters, the orientation angle of the reflection point acquired by the acquiring unit, and a value that is obtained by the relative speed of the reflection point being divided by the speed of the moving body.

6. The axial misalignment estimation apparatus according to claim 1, wherein:
the probability calculating unit is configured to acquire correspondence information that indicates a correspondence between the selection probability and the detection error and in which the selection probability is associated with the detection error as a numeric value that decreases as the detection error increases, and identify the selection probability based on the correspondence information.

7. The axial misalignment estimation apparatus according to claim 1, wherein:
with an error in speed of the moving body and the axial misalignment angle as unknown parameters, the axial misalignment calculating unit is configured to estimate the unknown parameters using a relational expression that is established between the unknown parameters, the orientation angle of the reflection point acquired by the acquiring unit, and a value that is obtained by the relative speed of the reflection point being divided by the speed of the moving body.

8. An axial misalignment estimation method for estimating an axial misalignment angle of a radar apparatus that is mounted in a moving body, the axial misalignment estimation method comprising:
repeatedly acquiring, for each reflection point that is detected by the radar apparatus, reflection point information that includes at least a relative speed between the radar apparatus and the reflection point, and an orientation angle that is an orientation angle of the reflection point and is at least either of a horizontal angle and a vertical angle that are determined with reference to a beam direction that is a direction along a center axis of a radar beam;
acquiring a speed of the moving body and extracting a stationary reflection point that is estimated to be a stationary object from the reflection points based on the speed of the moving body;
selecting, for each divided region, the stationary reflection point that is included in the divided region such that a predetermined condition is met, the divided region being a detection region of the radar apparatus that is divided into a plurality of parts in at least either of a horizontal direction and a vertical direction; and
determining the axial misalignment angle using the stationary reflection point selected, wherein:
selecting the stationary reflection point comprises
estimating a detection error by the radar apparatus at the stationary reflection point,
calculating, as a numeric value that decreases as the detection error increases, selection probability of the stationary reflection point being used in determining the axial misalignment angle, and
selecting the stationary reflection point that is included in the divided region such that a condition is met, the condition being that a number of stationary reflection points that are included in the divided region is selected based on the selection probability.

9. An axial misalignment estimation apparatus that estimates an axial misalignment angle of a radar apparatus that is mounted in a moving body, the axial misalignment estimation apparatus comprising:
a processor;
a non-transitory computer-readable storage medium; and
a set of computer-executable instructions stored on the non-transitory computer-readable storage medium that cause the processor to:
acquire, for each reflection point that is detected by the radar apparatus, reflection point information that includes at least a relative speed between the radar apparatus and the reflection point, and an orientation angle that is an orientation angle of the reflection point and is at least either of a horizontal angle and a vertical angle that are determined with reference to a beam direction that is a direction along a center axis of a radar beam;
acquire a speed of the moving body and extract a stationary reflection point that is estimated to be a stationary object from the reflection points based on the speed of the moving body;
select, for each divided region, the stationary reflection point that is included in the divided region such that a predetermined condition is met, the divided region being a detection region of the radar apparatus that is divided into a plurality of parts in at least either of a horizontal direction and a vertical direction; and
determine the axial misalignment angle using the selected stationary reflection point, wherein:
the selecting of the stationary reflection point includes
estimating a detection error by the radar apparatus at the stationary reflection point,
calculating, as a numeric value that decreases as the detection error increases, selection probability of the stationary reflection point being used, and
selecting the stationary reflection point that is included in the divided region such that a condition is met, the condition being that a number of stationary reflection points that are included in the divided region is selected based on the selection probability.

10. The axial misalignment estimation apparatus according to claim 9, wherein:
the set of computer-executable instructions further cause the processor to:
select the stationary reflection point that is included in the divided region such that a condition is met, the condition being that a number of stationary reflection points that are included in the divided region is equal to or less than an upper-limit number that is prescribed in advance.

11. The axial misalignment estimation apparatus according to claim 9, wherein:
the detection error is prescribed in advance for each divided region; and
the set of computer-executable instructions further cause the processor to:
estimate a detection error by the radar apparatus at the stationary reflection point, that is included in the divided region, based on the prescribed detection error.

12. The axial misalignment estimation apparatus according to claim 11, wherein:
the set of computer-executable instructions further cause the processor to:

acquire correspondence information that indicates a correspondence between the selection probability and the prescribed detection error and in which the selection probability is associated with the prescribed detection error as a numeric value that decreases as the prescribed detection error increases, and identify the selection probability based on the correspondence information.

13. The axial misalignment estimation apparatus according to claim 12, wherein:
with an error in speed of the moving body and the axial misalignment angle as unknown parameters, the set of computer-executable instructions further cause the processor to estimate the unknown parameters using a relational expression that is established between the unknown parameters, the orientation angle of the acquired reflection point, and a value that is obtained by the relative speed of the reflection point being divided by the speed of the moving body.

14. The axial misalignment estimation apparatus according to claim 9, wherein:
the set of computer-executable instructions further cause the processor to:
acquire correspondence information that indicates a correspondence between the selection probability and the detection error and in which the selection probability is associated with the detection error as a numeric value that decreases as the detection error increases, and identify the selection probability based on the correspondence information.

15. The axial misalignment estimation apparatus according to claim 9, wherein:
with an error in speed of the moving body and the axial misalignment angle as unknown parameters, the set of computer-executable instructions further cause the processor to estimate the unknown parameters using a relational expression that is established between the unknown parameters, the orientation angle of the acquired reflection point, and a value that is obtained by the relative speed of the reflection point being divided by the speed of the moving body.

* * * * *